Oct. 21, 1952 A. THOMAS 2,614,750

APPARATUS FOR COMPARING STATISTICAL RECORD CARDS

Filed Jan. 12, 1951

Inventor
ARTHUR THOMAS

By J. L. Sterling
Attorney

Patented Oct. 21, 1952 2,614,750

UNITED STATES PATENT OFFICE 2,614,750

APPARATUS FOR COMPARING STATISTICAL RECORD CARDS

Arthur Thomas, Wallington, England, assignor to Powers-Samas Accounting Machines Limited, London, England, a British company Application January 12, 1951, Serial No. 205,702
In Great Britain February 2, 1950

2 Claims. (Cl. 235—61.7)

Figures 1, 2:
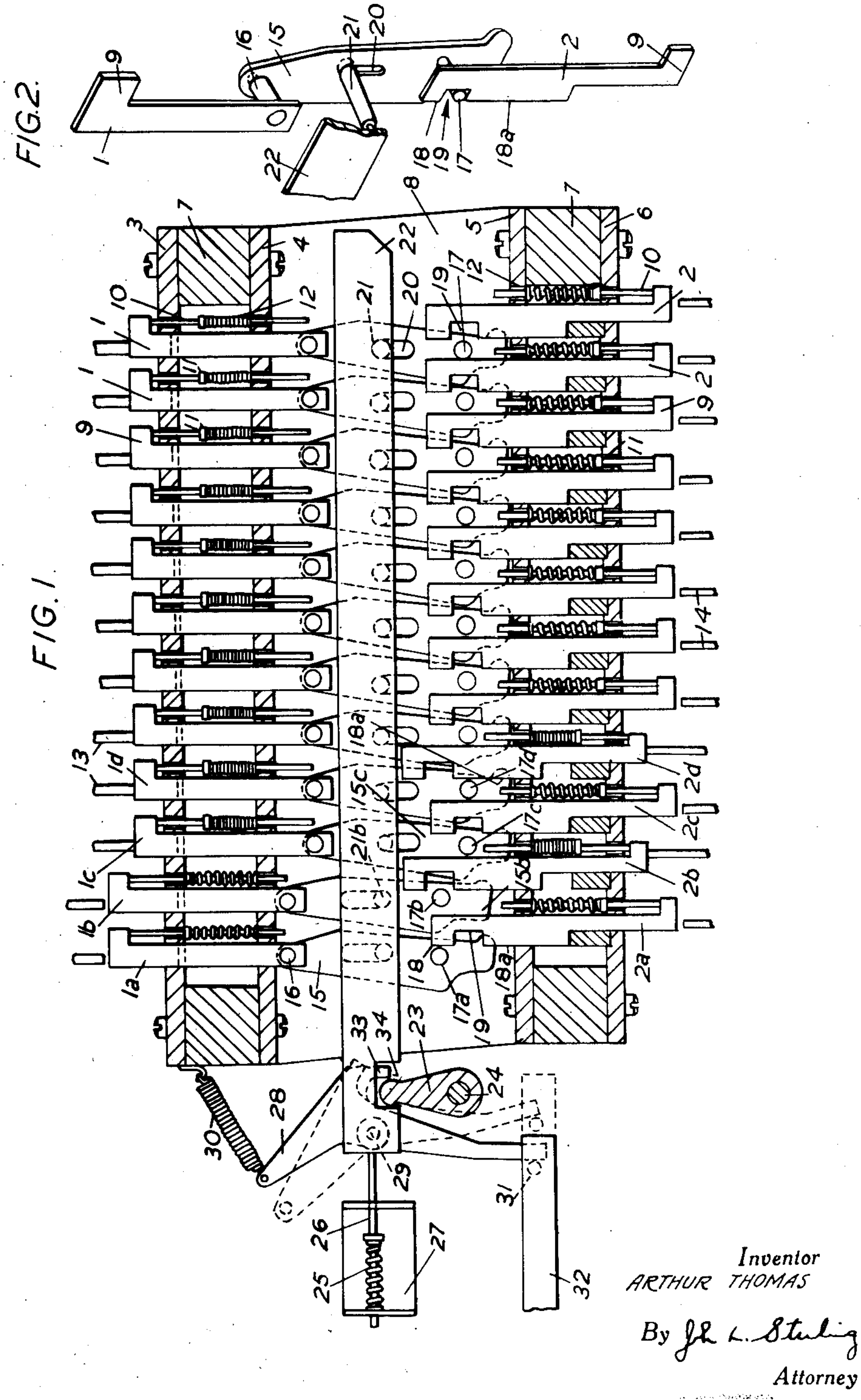

This invention relates to apparatus for comparing statistical record cards whereby information recorded on one card can be compared with information recorded on another card.

It is sometimes desired to compare the whole of the information contained in a record card with that contained in another card but often it is desired only to compare the information contained in a certain field of one card with the information contained in a predetermined field of another card. One example of the comparison of card fields is when, for the purpose of computing taxation, one card of a pair, which may be referred to as a primary card, contains a record made by way of perforations or otherwise in particular zones of the card, such information relating for example to a particular employee, the information being required by a central authority, for example the Government, to be supplied by the employer. The other card of each pair, which may be termed a secondary card, shows by perforations or otherwise the wages and hours of work and is used by the employer in order to compute this information. At intervals the employer returns the secondary cards and the authority desires to compare them with the primary cards. As regards the information common to the primary and secondary cards, the cards of a pair will be identical for any given employee. When the cards have been collected they are put through a sorting machine and mechanically brought into sequence, the primary cards then being in the same order as the secondary cards.

The apparatus according to the invention is intended to be used for comparing primary and secondary cards to ascertain whether the sequence is correct. It will, therefore, be understood that apparatus according to the invention is not intended to verify the correctness of entries recorded on the cards but is intended to ascertain whether in a selected field or fields the information contained in a pair of cards is identical.

In United States patent to Thomas No. 1,897,085, issued February 14, 1933, there has been described a machine for comparing perforated record cards, this machine comprising an upper and a lower sensing pin box of which the pins engage with upper and lower testing pins respectively, means tending to move one set of testing pins relatively to the other set and means preventing such relative movement when the cards passing through the upper and lower sensing pin boxes do not agree.

It is an object of the present invention to provide an improved form of comparing apparatus, the apparatus being so constructed that the individual parts of the apparatus can be manufactured and assembled in an economical manner.

According to the invention there is provided apparatus for comparing perforated record cards, comprising a first and second set of flat slidable elements, the elements of the two sets being paired to represent like card index positions and being movable in opposition as the result of impulses imparted thereto from record card sensing devices associated therewith, each slidable element of each set having an abutment extending therefrom and lying between the planes of the flat faces of the element, an axially movable pin associated with each slidable element to engage the abutment thereon, compression springs independently encircling the pins and through said pins urging the slidable elements of the two sets in opposite directions, and testing means to test the relative positions of the paired elements of the two sets of elements to determine whether the elements of the two sets indicate agreement or disagreement between two record cards acted upon by the sensing devices.

In one embodiment of the invention the testing means comprises for each slidable element of one of said sets, a detector plate pivoted to depend from its associated slidable element, a detector member extending laterally from the detector plate to detect in the other set the position of the slidable element with which it is paired, a testing element movable transversely of the paths in which the sliding elements are movable, a connecting member for each detector plate extending laterally from the testing element, each connecting member being located in a slot extending lengthwise of its associated detector plate to permit lengthwise movement of the detector plate relative to the testing element, and means to effect actuation of the testing element.

In order that the invention may be more clearly understood an embodiment thereof will be described by way of example with reference to the accompanying diagrammatic drawings in which, Figure 1 is a section through comparing apparatus according to the invention, and Figure 2 illustrates a detail of the arrangement of the apparatus.

Referring to the drawing, Figure 1 shows the comparing apparatus for comparing one column of a pair of record cards. It will be understood that the comparing apparatus will include a column for each card column of the cards to be compared, thus if the cards to be compared are 65-column cards then 65 columns as shown in Figure 1 will be employed in the comparing apparatus. Since, however, each of the columns of the comparing apparatus is identical it will be sufficient to the understanding of the invention to describe the construction and mode of operation of one column only.

The comparing apparatus comprises a first set of flat slidable elements 1 and a second set of flat slidable elements 2, the elements of the two sets being paired as shown in the drawing and each pair being representative of like card index positions. The slidable elements 1 and 2 are guided respectively for lengthwise movement in slots formed in guide plates 3, 4 and 5, 6 respectively, the guide plates being supported by bars 7 secured to the side frame 8 of the machine.

From the drawing it will be seen that each element 1 and 2 is provided with an abutment 9 which, as can be clearly seen from Figure 2, extends from the element and lies between the planes of the flat faces of the element. Associated with each of the slidable elements is an axially movable pin 10 supported for lengthwise movement in holes formed in the plates 3, 4 and 5, 6 respectively. Each of the pins 10 has a collar or shoulder 11 to abut against either the plate 3 or the plate 6, as shown in Figure 1, and compression springs 12 independent to each of the pins encircles the pins and urges the pins into engagement with their associated abutments 9, the pins and springs tending to urge the elements 1 and 2 in opposite directions.

The slidable elements 1 and 2 are also capable of movement in opposite directions as the result of impulses imparted thereto by transmission members indicated diagrammatically at 13 and 14 respectively. If desired, these transmission members may comprise elements similar to the parts 8 and 11 described in the aforesaid United States Patent No. 1,897,085 but preferably the comparing apparatus is associated with sensing apparatus as described in co-pending application S. N. 206,178, filed January 16, 1951, and the transmission members are constructed as therein described.

To the end of each of the sliding elements 1, opposite the end at which is formed the abutment 9, is connected a detector plate 15. The detector plate 15 is pivoted at 16 to the slidable element 1 and near its lower end is provided with a detector member constituted by a pin 17 which extends laterally from the detector plate. The detector member 17, as will be described below, detects whether the sliding elements 1 and 2 of a pair indicate agreement or disagreement and to this end the detector member 17 will be engaged with a face 18, 18*a* on a slidable element 2 or will be moved into a notch 19 formed therein.

Each detector plate 15 has a slot 20 formed therein and in the slot 20 is located a connecting member 21 comprising a pin which extends laterally from a testing element comprising a slide 22 mounted for movement transversely of the paths in which the slidable elements 1 and 2 are movable.

The testing element 22 is retained in inactive position, as shown in Figure 1, by a bail 23 mounted on a rock shaft 24 adapted to be rocked in known manner by a cam not shown. The bail 23 is common to each of the testing elements 22 provided in the comparing apparatus and each testing element 22 is urged to testing position, that is to the right as viewed in Figure 1, by a spring 25 surrounding a pin 26 mounted in a bracket 27 secured to the frame of the machine.

As has been previously mentioned it may be required only to compare certain selected card fields, for example fields composed of ten card columns, as it is only in these particular fields that the data contained in a primary and a secondary card is identical, the remaining fields of the cards containing unlike data. As it is not required to compare the columns known to contain unlike data means is provided whereby the comparing apparatus may be conditioned so that although these fields will be sensed by the sensing mechanism associated with the comparing apparatus and the results of the sensing will be transmitted to the comparing apparatus, the fact that there is disagreement between these fields of the cards will not interfere with the comparison being effected between the selected fields. To this end each column of the comparing apparatus is provided with a cut-out device which consists of a bell crank 28 pivoted at 29 to the testing element 22, the upper arm of the bell crank being under control of a spring 30 and the other arm of the bell crank being engaged by a pin 31 extending laterally from a cut out lever 32 settable from the rear of the machine. The bell crank 28 is provided with a hook element 33 which, when a testing element 22 is conditioned for a testing operation as shown in Figure 1, is hooked over the bail 23 and blocks off the open part of a notch 34 formed in the testing element 22 in which the bail is located. By this means when the slidable elements 1, 2 have been set and the shaft 24 is rocked to move the bail 23 clockwise as viewed in Figure 1, the testing element 22 is caused by its spring 25 to follow the movement of the bail if each of the slidable elements 1 and 2 of the column is in a state indicating agreement. As regards the cut-out columns, however, the bell cranks for those columns will have been moved to the position shown in dotted line in Figure 1 so that the hook 33 is raised out of the path of the bail 23 and although in those columns there may be indicated a state of disagreement the forward movement of the bail will not be obstructed by the testing bars for those columns as it will be free to move in the right hand portion of the slots 34 formed in the testing bars 22 for those columns although the testing bars for those columns will not follow the bail.

In order that the operation of the apparatus may be clearly understood there has been illustrated in Figure 1 the various conditions which can occur during the operation of the apparatus.

In the following description it will be assumed that the slidable elements 1 are to receive impulses as a result of the sensing of a primary card and that the slidable elements 2 are to receive impulses as the result of the sensing of a secondary card. It will also be understood that each element 1 is actuated when a hole is sensed in the corresponding index position of a primary card while, conversely, each element 2 is actuated as a result of there being no hole sensed in the corresponding index position of a secondary card.

If as a result of the sensing of a primary and a secondary card impulses are sent to the comparing apparatus indicating that for a particular index position there is no hole in the primary card but that there is a hole in the secondary card, then the slidable elements for that position will not be moved as is indicated at 1*a* and 2*a*. Consequently the detector member 17*a* will be located in the position shown in Figure 1 so that it will abut against the face 18 of the slidable element 2*a* and when the shaft 24 is rocked the bail 23 will be prevented from moving in a clockwise direction as the testing element 22 will be substantially restrained against movement to the right, as viewed in Figure 1, and movement of the bail will be obstructed by the hook 33 on the bell crank 28. The fact that the bail 23 cannot move through its full distance in a clockwise direction indicates disagreement between the primary and secondary cards and this lack of movement of the bail and its shaft 24 can be utilised to emit a signal indicative of the disagreement. The signal may take the form of mechanism adapted to deliver the primary and secondary cards into special card receivers as described in the aforesaid United States Patent No. 1,897,085, or it may actuate mechanism to effect a stoppage of the machine, or it may, if desired, actuate mechanism as described in co-pending application S. N. 205,841, filed January 13, 1951, whereby the two disagreeing cards are delivered to the same receivers as the agreeing cards but are displaced in the receiver with respect to the agreeing cards contained therein.

If on sensing a primary and a secondary card the condition sensed is that for a particular index position there is no hole in the primary or the secondary card, the comparing apparatus will be conditioned as indicated by the slidable elements 1*b*, 2*b* and the element 1*b* will not be actuated but the slidable element 2*b* will be moved upwards so that the notch 19 formed therein is moved into alignment with the detector member 17*b*. Accordingly when the shaft 24 is actuated, the bail 23 can, assuming conditions indicative of agreement in the other elements of the column, move clockwise to its full extent and the detector member 17*b* moves into the notch 19 in the slidable element 2*b*, as shown in Figure 2. As the bail 23 moves clockwise the spring 25 causes the testing element 22 to follow the bail so that the pin 21*b* rocks the detector plate 15*b* to move the detector member 17*b* into the notch 19.

If as a result of a sensing operation there is for a particular index position of the primary and secondary cards a hole in each of the cards then for that position there will be a state of agreement and this will be indicated in the comparing apparatus as shown by the slidable elements 1*c* and 2*c*. In this instance the slidable element 1*c* is moved downwards as indicated in Figure 1, while the slidable element 2*c* is not moved. The downward movement of the slidable element 1*c* causes the detector plate 15*c* to be moved relative to the testing element 22 so that the detector member 17*c* is lowered into alignment with the notch 19 in the slidable element 2*c*. Accordingly on operation of the shaft 24 the bail 23 can move to its full extent in its clockwise path in the manner just described in the preceding paragraph.

If, when a primary and a secondary card are sensed, it is found that for a particular index position there is a hole in the primary card but no hole in the secondary card, there exists a state of disagreement which is indicated in the comparing apparatus as shown by the slidable elements 1*d* and 2*d*. For this condition it will be observed that the slidable element 1*d* is moved downwards and that the slidable element 2*d* is moved upwards. The result of these movements of the slidable elements in opposite directions is that the notch 19 in the slidable element 2*d* is raised above the position to which the detector member 17*d* is lowered, and the detector member 17*d* is aligned with the face 18*a* of the slidable element 2*d*. Accordingly, on actuation of the shaft 24, as the testing element 22 is restrained against movement to the right, as viewed in Figure 1, the bail 23 is likewise restrained against movement thus indicating a condition of disagreement between the primary and secondary cards.

It will be understood that in the foregoing description of the operation of the apparatus there has been described each of the four conditions which may occur in a column of the comparing apparatus as the result of the sensing of a primary and a secondary card. It should also be understood that while each of these four conditions may occur in the same column with respect to one or more of the index positions represented thereby, a single condition indicative of disagreement will dominate to restrain movement of the bail 23 regardless of conditions indicative of agreement in all other paired elements 1, 2, of the same column.

From the foregoing it will be understood that by manufacturing the slidable elements, detector plates and testing elements in the form of thin flat plates it is possible to arrange the columns of the comparing apparatus in close relation so that if the apparatus is adapted for comparing cards having 65 or more columns the apparatus, as a whole, is of a minimum size. Further, the manufacturing processes entailed in making the flat elements are simpler, and therefore cheaper, than would be the case if elements of more complicated shape were employed, and the simple manner in which the parts can be assembled also further enhances the economy of production of apparatus according to the invention.

I claim:

1. Apparatus for comparing perforated record cards, comprising a first and a second set of flat slidable elements the elements of the two sets being paired to represent like card index positions and being movable in opposition as the result of impulses imparted thereto from record card sensing devices associated therewith, each slidable element of each set having an abutment extending therefrom, an axial movable pin associated with each slidable element to engage the abutment thereon, compression springs independently encircling the pins and through said pins urging the slidable elements of the two sets in opposite directions, and testing means to test the relative positions of the paired elements of the two sets of elements to determine whether the elements of the two sets indicate agreement or disagreement between two record cards acted upon by the sensing devices.

2. Apparatus according to claim 1, wherein the testing means comprises for each slidable element of one of said sets, a detector plate pivoted to depend from its associated slidable element, a detector member extending laterally from the detector plate to detect in the other set the position of the slidable element with which it is paired, a testing element movable transversely of the paths in which the slidable elements are movable, a connecting member for each detector plate extending laterally from the testing element, each connecting member being located in a slot extending lengthwise of its associated detector plate to permit lengthwise movement of the detector plate relative to the testing element and, means to effect actuation of the testing element.

ARTHUR THOMAS.

No references cited.